United States Patent Office 3,605,483
Patented Sept. 20, 1971

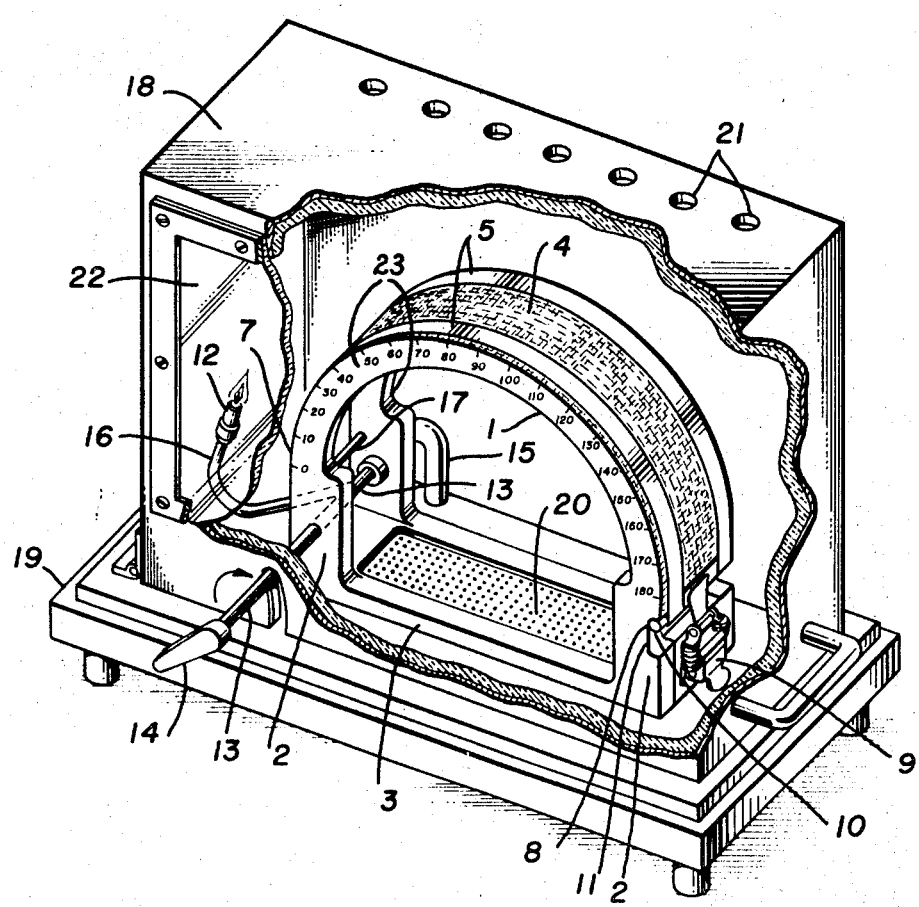

3,605,483
FLAMMABILITY TEST APPARATUS
Eugene L. Ringwald, Cary, Mitchell T. Burden, Apex, and Henry L. King, Cary, N.C., assignors to Monsanto Company, St. Louis, Mo.
Filed Oct. 29, 1968, Ser. No. 771,476
Int. Cl. G01n 25/01
U.S. Cl. 73—15
9 Claims

ABSTRACT OF THE DISCLOSURE

An apparatus for testing the flammability of a sheeted material comprised of a noninflammable bifurcated semicircular frame with means for holding the sheeted material between the bifurcations and along the frame, and means to ignite the sheeted material near one end of the frame.

BACKGROUND OF THE INVENTION

This invention relates to an apparatus for testing the flammability characteristics of combustible sheeted material, such as plastic films, fabrics, fibers, and the like, and more particularly comprises an apparatus for testing the ease of ignition propensity to burn, and rate of burning of such sheeted material.

Various devices are known for measuring the flammability of plastics, fabrics, carpets and the like. They include mechanical and electrical means and combinations thereof to provide in a series of samples, relative measurements of burning speed, heat of combustion, etc., by varying the application of heat, even by providing for testing at various slopes of the film or sheet from the vertical.

It is well known that a sheeted material will burn most rapidly in the direction of a draft; and that the draft caused by burning will, unless diverted, direct itself vertically. Samples of sheeted material may be tested for flammability while stretched in a vertical position or at any angle from the vertical; and variances as between different types of materials will be noted.

SUMMARY OF THE INVENTION

It is an object of this invention to provide in a sheeted material flammability testing apparatus, a full range of burning positions in a single sample being tested.

It is also an object of this invention to provide in a sheeted material flammability testing apparatus, a basis for comparison, as between sheeted samples, across the widest possible range of burning positions so far as relationship of the direction of the burn to the draft of supporting gas is concerned.

It is yet another object of this invention to provide a flammability testing apparatus of simple design, without moving parts which is economical to construct and operate, and which will provide a basis for comparing the most subtle differences in flammability characteristics among samples of sheeted materials.

Briefly, the objects of this invention are accomplished by the use of a noninflammable bifurcated semicircular frame, between and along the bifurcations of which is stretched the sample of the sheeted material. The frame is so mounted that the radius thereof projects upward from the horizontal. Therefore, when an ignition source is applied at one end of the frame, the path of burning will be first vertical, in the direction of the natural draft, progressing along the arc to horizontal at 90°; then, along an increasingly downward path to as much as 180°. The frame may be measured and marked in terms of any convenient graduation. Progress of the burning can be measured and timed. Subtle differences between the burning characteristics of different samples will become readily apparent by the use of this device. For example, it may be that in a series of samples the burning time between zero and 50 or 60 degrees along the semicircular frame will be identical or comparable; however, there may be, and usually are, vast observable differences between fabric samples as the path of the flame reaches the horizontal and assumes a descending path. From the 90° mark on towards 180°, not only does the speed of burning show variances as between samples, but the proclivity of the fabric to burn, measured in terms of progress of the flame, as well as the speed, clearly displays to the observer the true burning characteristics of the sample. It is, of course, necessary to provide a controlled draft in order to insure uniformity of burning conditions. This may be accomplished by placing the frame in a cabinet, with an evenly perforated base for ingress of supporting gas, and with evenly spaced vents for egress of exhaust. The material is stretched over the top of the bifurcations of the frame and may be secured in place by means of noninflammable flexible straps permanently secured at one end of the bifurcations of the frame, and spring-latched on the other end. Ignition means can be provided by a gas jet rotatably mounted on a handle extending to without the cabinet so that the jet may be applied to the sample when the cabinet is closed.

Other objects and advantages of this invention will become apparent from the following detailed description read in conjunction with the appended drawing in which:

The figure is a prospective view of one embodiment of this invention showing the frame exposed, with a material sample thereon, and with the cabinet cut away and in the closed position.

Referring in detail to the drawing, there is shown bifurcated semicircular frame 1 with mounting frame 2 on base 3. The bifurcations 23 of frame 1 are graduated in terms of degrees along the arc. Sheeted material Sample 4 is held in place between and along the bifurcations 23 of frame 1 by noninflammable flexible straps 5 which are permanently affixed at the juncture 7 of frame 1 and frame mounting means 2; and removably affixed at the juncture 8 of frame 1 and frame mounting means 2 by a spring-latch 9. The relative positions of straps 5 are maintained, when the straps are removed, by bar 10, which is permanently affixed to the ends of straps 5, and for which is provided recess 11 in frame mounting means 2. Gas jet nozzle 12 is affixed to the end of tubing 16 which is mounted on rotatable control rod 13 equipped with handle 14. The gas jet is provided with a flexible gas supply hose 15 which feeds tubing 16 through a hollowed portion of rod 13. Tubing 16 is provided with a stop 17 which is affixed to frame mounting means 2 and furnishes a finite stopping point for the jet when it approaches the sample ignition position. The testing frame is mounted in a cabinet having a hinged top 18 and cabinet base 19. Cabinet base 19 is provided with gas ingress perforations 20. Top 18 is provided with gas exhaust vents 21 and transparent observation plate 22.

In the operation of this embodiment, spring catch 9 is released and straps 5 are pulled away from frame 1 whereupon the remains of a burnt sample are removed and a fresh sample is placed across and along frame 1. Hooks are provided at juncture 7 (not shown) to hold one end of the sample in place, while straps 5 are again fastened. The gas supply is turned on and gas jet 12 is ignited. Cabinet top 18 is closed. Handle 14 is rotated rapidly in a clockwise direction until tubing 16 rests against stop 17. The jet is now in position to ignite the sample. Stop-watch timing is commenced when tubing 16 hits stop 17. Depending upon the nature of the sample being tested, readings are taken at uniform graduations along the degree scale on frame 1. The point at which burning stops is also recorded.

This device can be used to test and study the flammability patterns of many different types of materials. As used herein, the term "sheeted material" includes components of said materials including fibrous, filamentary or particulate components. The testing may be of the whole or of a component, with the remainder of the sheeted material serving only at a matrix or support. It is sometimes desirable in preparing a sample containing fibers to be tested to blend or twist them with noninflammable fibers, such as glass fibers and subsequently knit or weave into a fabric sample. This is particularly true in the case of fibers where shrinking during ignition and burning occurs. By using a composite sample. Such as described, a controlled uniform degree of burning of the fiber to be tested can be obtained. Also, depending upon the nature of the sheeted material to be tested, it may or may not be necessary to run the sample across an entire 180° arc of the semicircular frame. The invention permits the use of a controlled gas to support combustion where desirable; but with most test samples, we have found that excellent results are obtained with the use of the natural atmosphere to support combustion.

It is understood that the example given in the specification is intended only by way of illustration and that it may be modified in many details without departing from the spirit of our invention.

We claim:

1. A flammability testing device for sheeted material comprising a non-inflammable bifurcated semicircular frame having at least two parallel semicircular frame members, the center of said frames above the horizontal means for holding a sample of said sheeted material between said frame members, and means for igniting said sample near one end of said frame.

2. A flammability testing device for sheeted material comprising a non-inflammable bifurcated semicircular frame having at least two substantially parallel semicircular frame members, the mid-point radius of which frame projects upward from the horizontal, means for holding a sample of said sheeted material between said parallel members and along said frame, and ignition means for said sample near one end of said frame.

3. A flammability testing device for sheeted material comprising a non-inflammable cabinet consisting essentially of a base and a removable top; means at said cabinet base for permitting uniform ingress of gas; means at said cabinet top for permitting uniform egress of gas; a non-inflammable bifurcated semicircular frame having at least two substantially parallel semicircular frame members mounted within said cabinet, the radius of said frame at its mid-point projecting upward from the horizontal; mounting means on said cabinet base for said bifurcated frame; means for holding a sample of said sheeted material between said parallel frame members and along said frame; and ignition means for said sample near one end of said frame.

4. The appartus of claim 3 wherein said removable top is hinged to said cabinet base.

5. The apparatus of claim 3 wherein the radii of said bifurcated semicircular frame at the ends of said frame are substantially horizontal.

6. The apparatus of claim 3 wherein said bifurcated semicircular frame is marked in radial graduations.

7. The apparatus of claim 3 wherein said means for holding said sample across the bifurcations comprises flexible metallic straps permanently secured at one end and releasibly secured at the other end of said frame bifurcations.

8. The apparatus of claim 3 wherein said ignition means comprises a moveable gas jet.

9. The apparatus of claim 8 wherein said moveable gas jet is rotatably mounted on said bifurcated frame mounting means, and remotely controlled from without said cabinet.

References Cited

UNITED STATES PATENTS 2,636,388   4/1953   Blegen _____ 73—15

JAMES J. GILL, Primary Examiner

H. GOLDSTEIN, Assistant Examiner

U.S. Cl. X.R.

73—159